United States Patent
Hayashi et al.

(10) Patent No.: US 6,719,624 B2
(45) Date of Patent: Apr. 13, 2004

(54) VEHICLE AIR CONDITIONING SYSTEM WITH SEAT AIR CONDITIONER

(75) Inventors: Kosuke Hayashi, Nisshin (JP); Takeshi Yoshinori, Okazaki (JP); Shigeki Harada, Toyota (JP); Akira Yamaguchi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/303,417

(22) Filed: Nov. 25, 2002

(65) Prior Publication Data

US 2003/0109212 A1 Jun. 12, 2003

(30) Foreign Application Priority Data

Dec. 6, 2001 (JP) .................................... 2001-372916
Jun. 27, 2002 (JP) .................................... 2002-187766

(51) Int. Cl.$^7$ ................................................ A47C 7/74
(52) U.S. Cl. ........................................ 454/120; 62/239
(58) Field of Search ......................... 454/120; 62/239, 62/261; 297/180.15, 180.1; 219/202

(56) References Cited

U.S. PATENT DOCUMENTS

| | | | | |
|---|---|---|---|---|
| 4,901,788 A | * | 2/1990 | Doi | ............................ 165/204 |
| 5,148,977 A | * | 9/1992 | Hibino et al. | ............... 236/49.3 |
| 5,390,728 A | * | 2/1995 | Ban | ............................ 165/204 |
| 5,549,152 A | * | 8/1996 | Davis et al. | ................. 165/201 |
| 6,079,485 A | | 6/2000 | Esaki et al. | |

FOREIGN PATENT DOCUMENTS

WO    WO96/05475    2/1996

\* cited by examiner

Primary Examiner—Derek Boles
(74) Attorney, Agent, or Firm—Harness, Dickey & Pierce, PLC

(57) ABSTRACT

An air conditioning system for a vehicle exhibits a room air conditioner unit for air conditioning a passenger compartment, a seat air conditioner unit for adjusting a temperature of a seat, a temperature sensor for detecting a temperature at a front location of a passenger seated on the seat and the temperature of the seat, and a control unit for controlling operation of the room air conditioner unit and the seat air conditioner unit so that a difference between the temperature at the front of the passenger and the temperature of the seat falls within a certain value range. As a result, a difference in heat sensation between the front and the back of the passenger is reduced, and hence the comfortableness of the passenger compartment can be improved.

15 Claims, 6 Drawing Sheets

VEHICLE AIR CONDITIONING SYSTEM WITH SEAT AIR CONDITIONER

CROSS REFERENCE TO RELATED APPLICATIONS

This application is based upon, claims the benefit of priority of, and incorporates by reference the contents of prior Japanese Patent Applications No. 2001-372916 filed on Dec. 6, 2001, and No. 2002-187766 filed on Jun. 27, 2002.

BACKGROUND OF THE INVENTION

1. Field of the Invention

The present invention relates to an air conditioning system for air conditioning the passenger compartment of a vehicle.

2. Description of the Related Art

In General, the air conditioning system for a vehicle proposed in Japanese National Publication No. Hei. 10-504977 has been known as a vehicle air conditioning system having a room air conditioner unit for air conditioning the passenger compartment and a seat air conditioner unit for adjusting the temperature of the seat. The conventional system described in this publication is configured to detect the temperature of the air surrounding the driver or a passenger (hereinafter, referred to simply as the passenger) and the temperature of air inside the seat, and automatically adjust the temperature of the seat by the seat air conditioner unit. In this case, the seat air conditioner unit adjusts the temperature of the seat independently of the room air conditioner unit.

Also, another conventional system described in Japanese Patent Laid-Open Publication No. Hei. 10-297243 performs control in such a manner that the room air conditioner unit and the seat air conditioner unit correlate with each other on the basis of the compartment temperature, an amount of illumination of sunlight, etc. The first-mentioned conventional system, however, has a problem that because the seat air conditioner unit controls the temperature independently of the room air conditioner unit, a difference in heat sensation is caused between the front and the back of the passenger, due to which the passenger may have an uncomfortable feeling.

To be more specific, in the summertime, the room air conditioner unit cools the entire passenger compartment whereas the seat air conditioner unit directly cools the back of the passenger. Hence, the back of the passenger cools more rapidly than the front and a considerable difference in heat sensation is caused between the front and the back of the passenger, due to which the passenger may have an uncomfortable feeling. Conversely, if the control is performed so as to force air conditioning air toward the passenger intensively, the front of the passenger is cooled more rapidly than the back, and this also causes a significant difference in heat sensation between the front and the back of the passenger. Further, in the wintertime, the room air conditioner unit heats the entire passenger compartment, whereas the seat air conditioner unit directly heats the back of the passenger. Hence, the back of the passenger heats more rapidly than the front, and a considerable difference in heat sensation is caused between the front and the back of the passenger.

Alternatively, the second-mentioned conventional system performs control in such a manner that the room air conditioner unit and the seat air conditioner unit have a correlation with each other. However, the heat sensation of the passenger is estimated from information, such as the compartment temperature and the amount of sunlight, which makes it impossible to estimate heat sensations at specific locations such as the front and the rear of the passenger. Hence, this system also cannot eliminate the uncomfortable feeling a passenger may have due to a difference in heat sensations between the front and the rear of the passenger.

SUMMARY OF THE INVENTION

The present invention was devised in view of the foregoing, and therefore, has an object to improve the comfortableness of the passenger compartment by reducing a difference in heat sensations between the front and the rear of the passenger.

In order to achieve the above and other objects, a first aspect of the invention provides an air conditioning system for a vehicle furnished with: a room air conditioner unit (1) for air conditioning a passenger compartment; a seat air conditioner unit (2) for adjusting a temperature of a seat (3); a temperature sensor (5) for detecting a temperature at the front of a passenger seated on the seat (3) and the temperature of the seat (3); and a control unit (4) for controlling operation of at least one of the room air conditioner unit (1) and the seat air conditioner unit (2) so that a difference between the temperature at the front of the passenger and the temperature of the seat (3) falls within a certain value range. When the air conditioning system is configured in this manner, a difference in heat sensations between the front and the rear of the passenger is reduced, and hence the comfortableness of the passenger compartment can be improved.

When the first aspect is implemented, according to a second aspect of the invention, an infrared sensor including an element for detecting the temperature at the front of the passenger and an element for detecting the temperature of the seat (3) may be adopted as the temperature sensor (5).

According to a third aspect of the invention, the temperature sensor is composed of a sensor for detecting the temperature at the front of the passenger and a sensor for detecting the temperature of the seat (3) at a location in contact with a back of the passenger.

When the air conditioning system is configured in this manner, the temperature at a portion in contact with the back of the passenger is detected, and heat sensations at the back of the passenger can be accurately detected, which allows more appropriate control to be performed. Hence, the comfortableness of the passenger compartment can be further improved.

According to a fourth aspect of the invention, the seat air conditioner unit (2) includes a blower (21) for blowing air away from the seat (3), and an air-quantity regulating means (25) for regulating a quantity of air blown away from a right side of the seat (3) and a quantity of air blown away from a left side of the seat (3). Also, the temperature sensor (5) is a sensor capable of detecting a temperature at a right front of the passenger and a temperature at a left front of the passenger. Further, the control unit (4) controls operation of the air quantity regulating means (25) based on the temperature at the right front of the passenger and the temperature at the left front of the passenger.

When the air conditioning system is configured in this manner, for example, in the event that the direction and a quantity of sunlight cause a temperature difference between the right front and the left front of the passenger, a local difference in heat sensation due to sunlight or the like can be reduced by adjusting a quantity of air blown from the right side and a quantity of air blown from the left side of the seat on the basis of the temperature difference. Hence, the comfortableness of the passenger compartment can be further improved.

A fifth aspect of the invention provides an air conditioning system for a vehicle furnished with: a room air conditioner unit (1) for air conditioning a passenger compartment and an air-conditioned condition detecting means (5) for detecting an air-conditioned condition at a front location of a passenger seated on a seat (3) and an air-conditioned condition at a contact surface of the passenger with the seat (3). The operation of the room air conditioner unit (1) is controlled so that a difference between two detected values respectively indicating the air-conditioned conditions falls within a certain value range. When the air conditioning system is configured in this manner, even in an air conditioning system having no seat air conditioner unit, a difference in heat sensation between the front and the back of the passenger is reduced, and hence the comfortableness of the passenger and the passenger compartment is improved.

A sixth aspect of the invention provides an air conditioning system for a vehicle furnished with: a room air conditioner unit (1) for air conditioning a passenger compartment; a seat air conditioner unit (2) for adjusting a temperature of a seat (3); and an air-conditioned condition detecting means (5) for detecting an air-conditioned condition at a front location of a passenger seated on the seat (3) and an air-conditioned condition on a contact surface of the passenger with the seat (3). The direction of air blown from the room air conditioner unit (1) is controlled so that a difference between two detected values respectively indicating the air-conditioned conditions falls within a certain value range.

When the air conditioning system is configured in this manner, a difference in heat sensation between the front and the back of the passenger is reduced, and hence the comfortableness of the passenger compartment can be improved.

According to a seventh aspect of the invention, one of a skin temperature of the passenger and heat sensation of the passenger estimated from the skin temperature of the passenger may be used as the two detected values respectively indicating the air-conditioned conditions.

According to an eighth aspect of the invention, the skin temperature of the passenger may be determined based on the temperature of the clothes the passenger is wearing and the temperature of the seat (3).

According to a ninth aspect of the invention, an infrared sensor (5) for detecting the temperature of the clothes the passenger is wearing and the temperature of the seat (3) may be used as the air-conditioned condition detecting means.

According to a tenth aspect of the invention, the infrared sensor (5) may include an element for detecting the temperature of the clothes the passenger is wearing and an element for detecting the temperature of the seat (3).

According to an eleventh aspect of the invention, the certain value to be compared with the difference between the two detected values respectively indicating the air-conditioned conditions changes in response to an air-conditioned condition in the passenger compartment.

When the air conditioning system is configured in this manner, by increasing the certain value when the air-conditioned condition in the passenger compartment is in transition, for example, the uncomfortable feeling the passenger may have due to a difference in heat sensation between the front and the back of the passenger can be reduced while maintaining a time necessary to reach the target room temperature. Also, by decreasing the certain value when the air-conditioned condition in the passenger compartment is stable, infants or elderly people with suppressed temperature-controlling functions feel comfortable because the stress they may feel is lessened.

According to a twelfth aspect of the invention, the certain value to be compared with the difference between the two detected values, respectively indicating the air-conditioned conditions, is set for each seat.

When the air conditioning system is configured in this manner, even in the event that the air conditioning heat load varies from seat to seat due to the influence of sunlight, for example, it is possible to perform the control best suited to each seat by setting the certain value for each seat.

According to a thirteenth aspect of the invention, the certain value to be compared with the difference between the two detected values, respectively indicating the air-conditioned conditions, is set by each passenger. When the air conditioning system is configured in this manner, control can be performed according to each passenger's desire.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

(First Embodiment)

Figure 1:
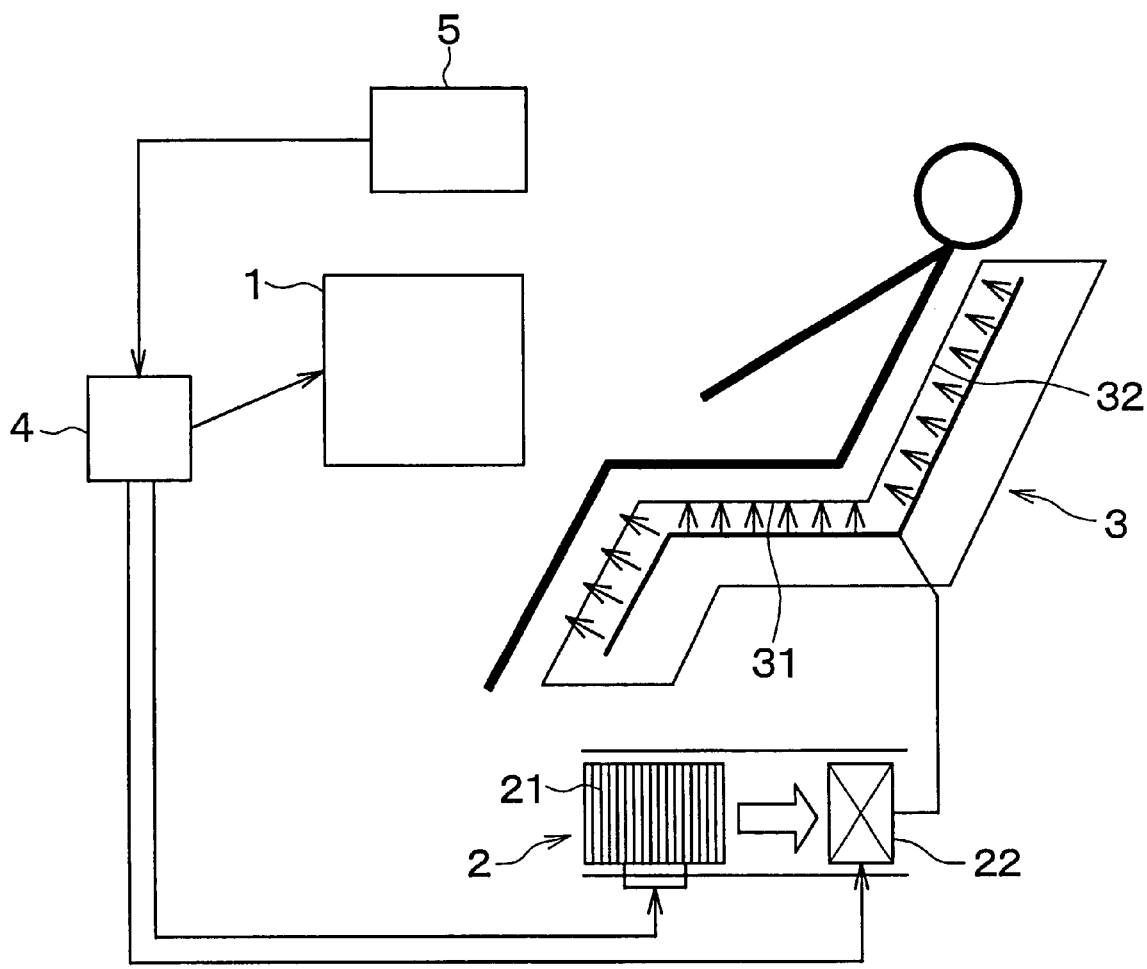
FIG. 1 is a schematic showing a configuration of an overall air conditioning system for a vehicle according to a first embodiment of the invention.

FIG. 1 is a schematic showing an overall configuration of an air conditioning system for a vehicle having a room air conditioner unit 1 for air conditioning the passenger compartment and a seat air conditioner unit 2 for adjusting the temperature of the seat.

Referring to FIG. 1, the room air conditioner unit 1 is a known unit that air-conditions the passenger compartment by cooling or heating air and discharging it into the passenger compartment. The room air conditioner unit 1 is provided with a blower for blowing air, a refrigerating cycle for cooling air through a heat-exchange process between a refrigerant and air, a heater core for heating air through a heat exchange process between engine cooling water (hot water) and air, an air outlet switching door for switching air blowing directions, etc. (all of which are not shown in the drawings).

A seat 3 has a seat cushion 31 for supporting the buttocks and upper legs of a passenger and a seat back 32 for supporting the back of the passenger. The seat air conditioner unit 2 for adjusting the temperature of the seat 3 is provided with a blower 21 for blowing air taken in from the passenger compartment, and a heater 22 for heating air, the heater being disposed downstream of the blower 21. The seat air conditioner unit 2 is configured to blow air from air outlets (not shown) of the seat cushion 31 and the seat back 32 of the seat 3. The blower 21 is provided with an electric motor and a fan, and a quantity of air to be blown is controlled by controlling a voltage applied to the electric motor. Also, the heater 22 is configured so that an air-heating quantity is controlled by controlling a voltage applied to the heater 22.

A control unit 4 for controlling the room air conditioner unit 1 and the seat air conditioner unit 2 is a unit based on a microcomputer (not shown) with an internal ROM (not shown) that stores a control program. The control unit 4 runs the control program and thereby controls the temperature and a quantity of air to be blown into the passenger compartment by controlling operation of the room air conditioner unit 1. The control unit 4 also controls the temperature and a quantity of air blowing from the seat 3 by controlling the blower 21 and the heater 22 in the seat air conditioner unit 2.

The control unit 4 receives signals from a room-air temperature sensor for detecting the temperature of room air, an ambient-air temperature sensor for detecting the temperature of ambient air, a sunlight sensor for detecting the amount of sunlight, a temperature setting switch for setting the compartment temperature as the passenger desires, etc. (none which are shown), and the like. Moreover, the unit 4 receives a signal from a temperature sensor 5 for detecting the temperature at the front of the passenger seated on the seat 3 and the temperature of the seat 3.

The temperature sensor 5 is an infrared sensor for outputting an electric signal corresponding to a change in an amount of infrared rays associated with a change in temperature at a portion subjected to temperature measurement. In the present embodiment, the temperature sensor 5 includes a plurality of thermal sensing elements and is located on the ceiling of the vehicle interior near the rearview mirror. The temperature sensor 5 detects the surface temperature (hereinafter, referred to as the passenger's front clothing temperature) Tf at the front upper body portion of the clothes that the passenger seated on the seat 3 is wearing. This detection is done using some of the thermal sensing elements. Detection of the surface temperature (hereinafter, referred to as the seat surface temperature) Tseat of the seat 3 is detected at a portion unoccupied (not covered) by the passenger using the balance of the thermal sensing elements.

Figure 2:
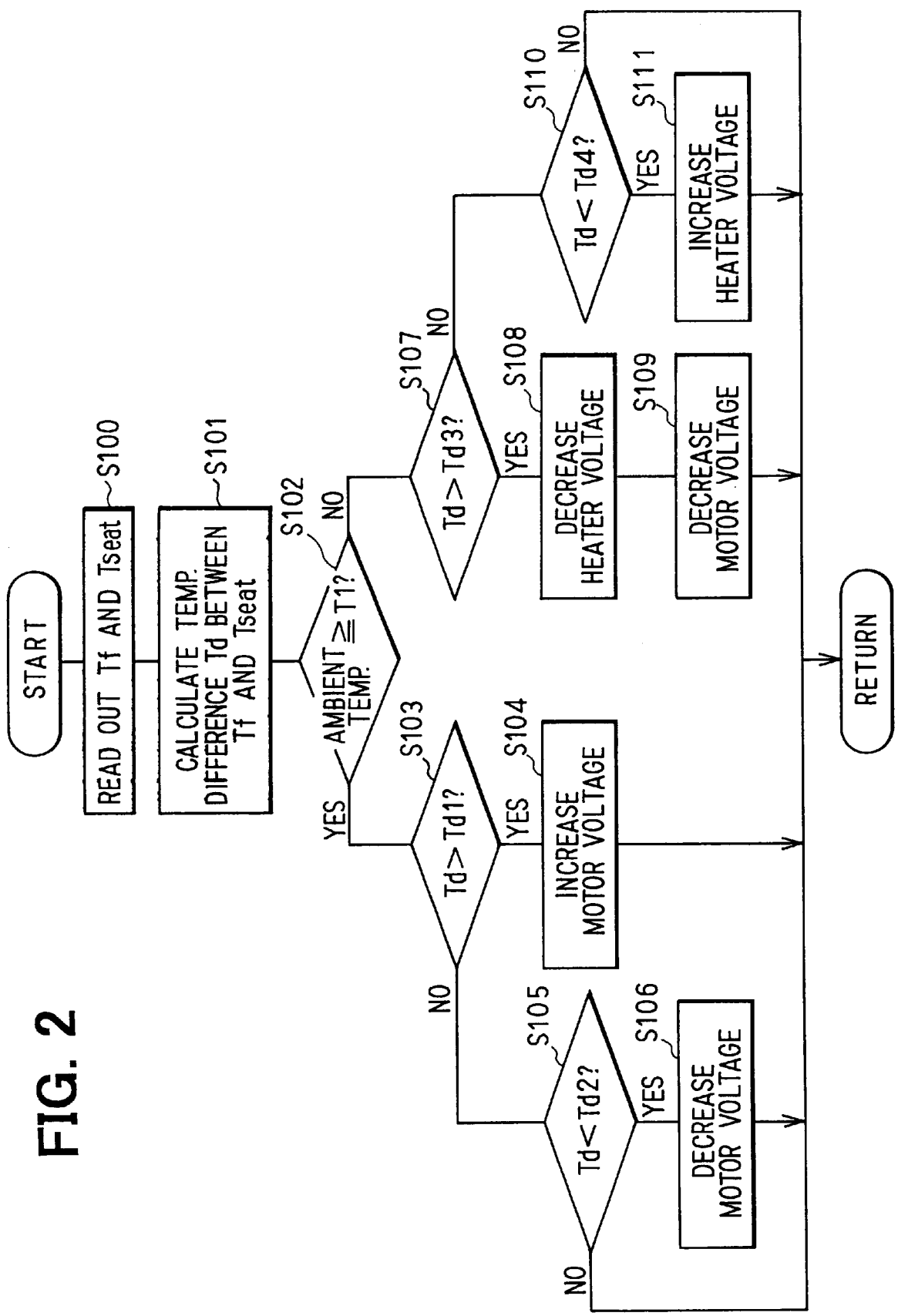
FIG. 2 is a flowchart showing part of a control program run by a control unit shown in FIG. 1.

Next, the following description will describe operation of the air conditioning system for a vehicle with reference to FIG. 2 that details the control program run by the control unit 4.

When the engine is started, the room air conditioner unit 1 and the seat air conditioner unit 2 begin to operate. The control unit 4 controls the temperature and a quantity of air blown from the room air conditioner unit 1 in accordance with the control program stored therein so that the compartment temperature becomes equal to the desired set temperature. Meanwhile, the control unit 4 controls the temperature and a quantity of air blown from the seat air conditioner unit 2 in accordance with the control program detailed in FIG. 2.

Here, the seat air conditioner unit 2 is configured so that it activates the blower 21 alone for merely blowing air during the summertime, and so that it activates both the blower 21 and the heater 22 during the winter for blowing hot air from the seat 3.

Referring to FIG. 2, in Step S100, detection signals as to the ambient temperature, a passenger's front clothing temperature Tf, and the seat surface temperature Tseat are read. Then, in Step S101, a temperature difference Td between the passenger's front clothing temperature Tf and the seat surface temperature Tseat is calculated. Here, the temperature difference Td is defined as: Td=Tseat−Tf.

Then, in Step S102, the ambient temperature is compared with a certain temperature T1 to roughly estimate whether the season is summer or winter. In this regard, it is preferable to set the certain temperature T1 to approximately 10° C. (50° F.).

In the case of YES in Step S102, that is, when the season is estimated as summer because the ambient temperature is high, the flow proceeds to Step S103. In Step S103, the temperature difference Td is compared with an allowable upper limit (hereinafter, referred to as the summertime allowable upper limit) Td1 of the temperature difference Td in the summertime determined on the basis of the heat sensation of the passenger. Here, the summertime allowable upper limit Td1 is a positive value, for example, 10° C. In a case where the temperature difference Td exceeds the summertime allowable upper limit Td1, that is, in the case where the temperature of the seat 3 is so high that the passenger feels the seat 3 is uncomfortably hot when he or she initially sits in the seat, YES is judged in Step S103 and the flow proceeds to Step S104.

In Step S104, a voltage to be applied to the motor of the blower 21 in the seat air conditioner unit 2 is increased. Accordingly, a quantity of air blown from the seat 3 is increased, and the seat surface temperature Tseat is lowered. As a result, the temperature at the back of the passenger is lowered, and a difference in heat sensation between the front and the back of the passenger is thus reduced. Hence, the overall comfortableness of the passenger compartment is improved.

In the case of NO in Step S103, the flow proceeds to Step S105, where the temperature difference Td is compared with an allowable lower limit (hereinafter, referred to as the summertime allowable lower limit) Td2 of the temperature difference Td in the summertime determined on the basis of heat sensation of the passenger. Here, the summertime allowable lower limit Td2 is a negative value, for example, −10° C. When the temperature difference Td is below the summertime allowable lower limit Td2, that is, when the seat 3 is cooled exceedingly and the temperature of the seat 3 drops too low, YES is judged in Step S105, and the flow thereby proceeds to Step S106.

In Step S106, a voltage to be applied to the motor of the blower 21 is decreased. Accordingly, a quantity of air blown from the seat 3 is reduced, and the seat surface temperature Tseat rises. As a result, the temperature at the back of the passenger rises and a difference in heat sensation between the front and the back of the passenger is thus reduced. Hence, the comfort of the passenger and the comfortableness of the passenger compartment is improved. Also, power consumed in cooling the seat 3 more than necessary, which is a waste of power, can be saved.

In the case of NO in both Step S103 and Step S105, that is, when $Td2 \leq Td \leq Td1$, the temperature difference Td is within a proper range. Hence, a voltage being applied to the motor of the blower 21 is not changed, and the quantity of air is maintained.

On the other hand, in the case of NO in Step S102, that is, when the season is estimated as winter because the ambient temperature is low, the flow proceeds to Step S107, where the temperature difference Td is compared with an allowable upper limit (hereinafter, referred to as the wintertime allowable upper limit) Td3 of the temperature difference Td in the wintertime determined on the basis of heat sensation of the passenger. Here, the wintertime allowable upper limit Td3 is a positive value, for example, 10° C. In a case where the temperature difference Td exceeds the wintertime allowable upper limit Td3, that is, when seat 3 is heated exceedingly and the temperature of the seat 3 rises too high, YES is judged in Step S107, and the flow thereby proceeds to Step S108.

In Step S108, a voltage to be applied to the heater 22 in the seat air conditioner unit 2 is decreased. Subsequently, a voltage to be applied to the motor of the blower 21 is decreased in Step S109. Accordingly, the temperature of air blown from the seat 3 is lowered while a quantity of air blown from the seat 3 is reduced, and the seat surface temperature Tseat is lowered. As a result, the temperature at the back of the passenger is lowered, and a difference in heat sensation between the front and the back of the passenger is reduced. Hence, the comfortableness of the passenger compartment is improved. Also, power consumed in heating the seat 3 more than necessary can be saved.

In the case of NO in Step S107, the flow proceeds to Step S110, where the temperature difference Td is compared with an allowable lower limit (hereinafter, referred to as the wintertime allowable lower limit) Td4 of the temperature difference Td in the wintertime determined on the basis of heat sensation of the passenger. Here, the wintertime allowable lower limit Td4 is a negative value, for example, −10° C. In a case where the temperature difference Td is below the wintertime allowable lower limit Td4, that is, in the case where the temperature of the seat 3 is so low that the passenger feels the seat 3 is uncomfortably cold when he or she initially sits in the seat, YES is judged in Step S110, and the flow thereby proceeds to Step S111.

In Step S111, a voltage to be applied to the heater 22 is increased. Accordingly, the temperature of air blown from the seat 3 rises, and so does the seat surface temperature Tseat. As a result, the temperature at the back of the passenger rises, and a difference in heat sensation between the front and the back of the passenger is thus reduced. Hence, the comfortableness of the passenger compartment is improved.

In the case of NO in both Step S107 and Step S110, that is, when $Td4 \leq Td \leq Td3$, the temperature difference Td is within a proper range. Hence, voltages being applied to the blower 21 and the heater 22 are not changed, and the quantity and temperature of air are maintained.

The four values Td1 through Td4 correspond to the "certain value" referred to in the invention. A "certain value range" is a range of values above or below the certain value, depending upon the particular comparison.

In the present embodiment, operation of the seat air conditioner unit 2 is controlled in such a manner that the temperature difference between the temperature at the front of the passenger and the temperature of the seat 3 falls within the certain value ranges. Hence, the comfortableness of the passenger compartment can be improved by reducing a difference in heat sensation between the front and the back of the passenger.

(Second Embodiment)

The present embodiment is identical to the first embodiment above except that a quantity of air blown from the right side of the seat and a quantity of air blown from the left side of the seat are regulated on the basis of the temperature at the right front of the passenger and the temperature at the left front of the passenger, respectively.

In the present embodiment, the temperature sensor 5 (see FIG. 1) employs an infrared sensor having at least three thermal sensing elements. More specifically, the temperature sensor 5 detects the surface temperature (hereinafter, referred to as the passenger's right front temperature) Tfr at the right front of the upper body clothing that the passenger seated on the seat 3 is wearing, the surface temperature (hereinafter, referred to as the passenger's left front temperature) Tfl at the left front of the upper body clothing that the passenger seated on the seat 3 is wearing, and the surface temperature (hereinafter, referred to as the seat surface temperature) Tseat of the seat 3 at a portion unoccupied (not covered) by the passenger.

Figure 3:
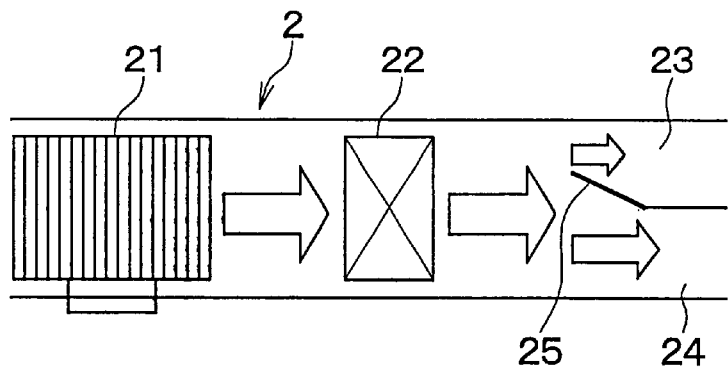
FIG. 3 is a view showing an air conditioning configuration in an air conditioning system for a vehicle according to a second embodiment of the invention.

Also, as shown in FIG. 3, the seat air conditioner unit 2 has an air duct branched to a right air duct 23 and a left air duct 24 at the downstream side of the heater 22. Also, a pivotally movable air volume regulating door 25 is provided at the branching point of the air ducts 23 and 24, and serves as an air volume regulating means for regulating a ratio between a quantity of air flowing into the right air duct 23 and a quantity of air flowing into the left air duct 24.

Further, each of the air outlets of the seat cushion 31 and the seat back 32 of the seat 3 (see FIG. 1) is divided into a right air outlet (not shown) and a left air outlet (not shown). Hence, air flowing through the right air duct 23 is blown from the right air outlets and air flowing through the left air duct 24 is blown from the left air outlets.

As with the first embodiment above, the control unit 4 (see FIG. 1) of the present embodiment controls operation of the seat air conditioner unit 2 so that the temperature difference between the temperature at the front of the passenger and the temperature of the seat 3 falls within the certain value range. Also, in the event that the direction and an amount of sunlight causes a difference between the temperature at the right front of the passenger and the temperature at the left front of the passenger, the control unit 4 controls the seat air conditioner unit 2 according to the following description.

As an example, assume there is a difference between the passenger's right front temperature Tfr and the passenger's left front temperature Tfl detected by the temperature sensor 5 when only the blower 21 is activated in the summertime, and that the passenger's right front temperature Tfr becomes higher than the passenger's left front temperature Tfl. Then, the position of the air volume regulating door 25 is controlled to regulate the ratio of quantities of air in such a manner that a quantity of air blown from the right air outlets is greater than a quantity of air blown from the left air outlets of the seat 3.

As has been described, in the event there is a temperature difference between the right front and the left front of the passenger, a local difference in heat sensation caused by sunlight or the like is reduced by regulating a quantity of air blown from the right side and a quantity of air blown from the left side of the seat on the basis of the temperature difference. Hence, the comfortableness of the passenger compartment can be further improved.

(Third Embodiment)

In each of the embodiments above, a difference in heat sensation between the front and the back of the passenger is reduced by controlling operation of the seat air conditioner unit 2. In the present embodiment, however, a difference in heat sensation is reduced by controlling operation of the room air conditioner unit 1.

Figure 4:
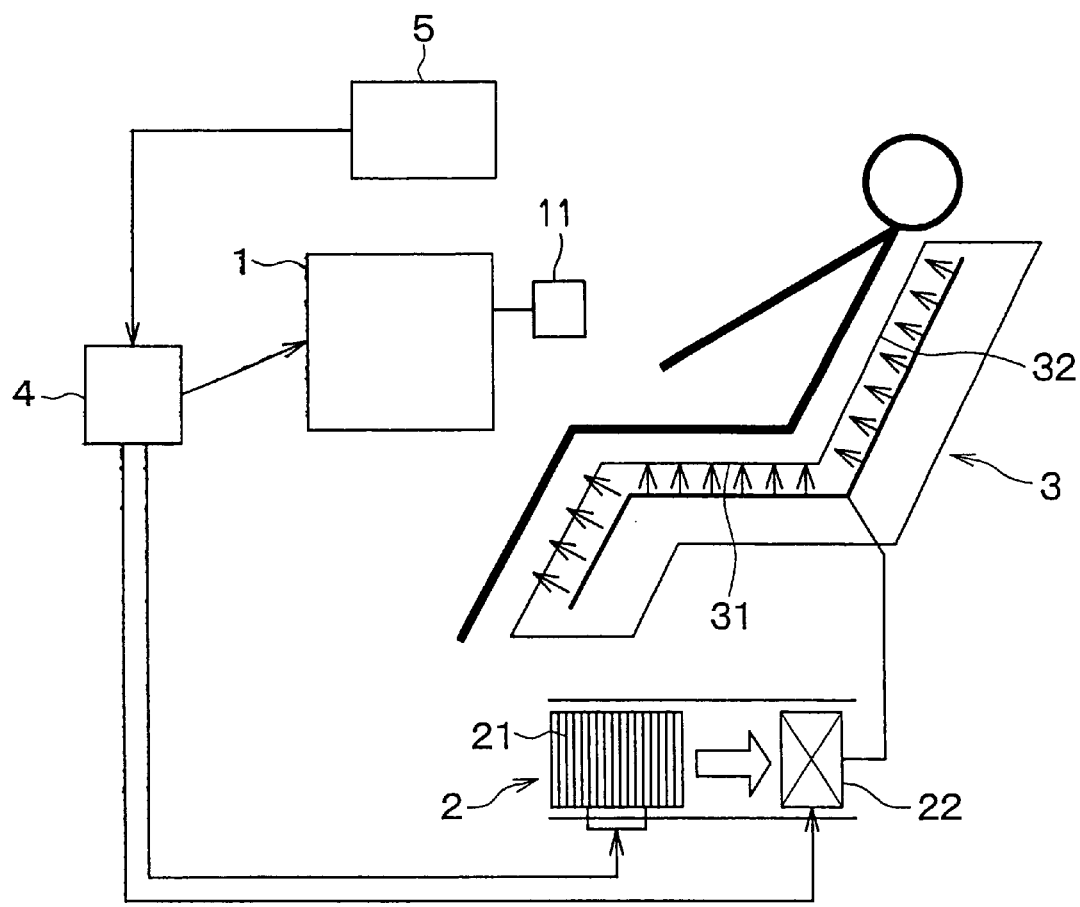
FIG. 4 is a schematic showing a configuration of an overall air conditioning system for a vehicle according to a third embodiment of the invention.

FIG. 4 is a view showing a configuration of an overall air conditioning system for a vehicle of the third embodiment. Components in the third embodiment that are the same as components of the first embodiment are labeled with the same reference numerals, so explanations of those components are omitted.

Referring to FIG. 4, a face air-blowing aperture of the room air conditioner unit 1 is provided with a swing louver 11 that serves as an air-direction adjusting means capable of adjusting the blowing direction of air conditioning air. The swing louver 11 is able to adjust the blowing direction of air conditioning air as it turns in the width direction of the vehicle in association with a louver that is driven by an actuator, such as a step motor. Incidentally, when the cold air is turned on, the swing louver 11 is kept turned within specific angles covering the passenger's seated position, and thereby constantly changes the blowing direction of the air conditioning air.

Figure 5:
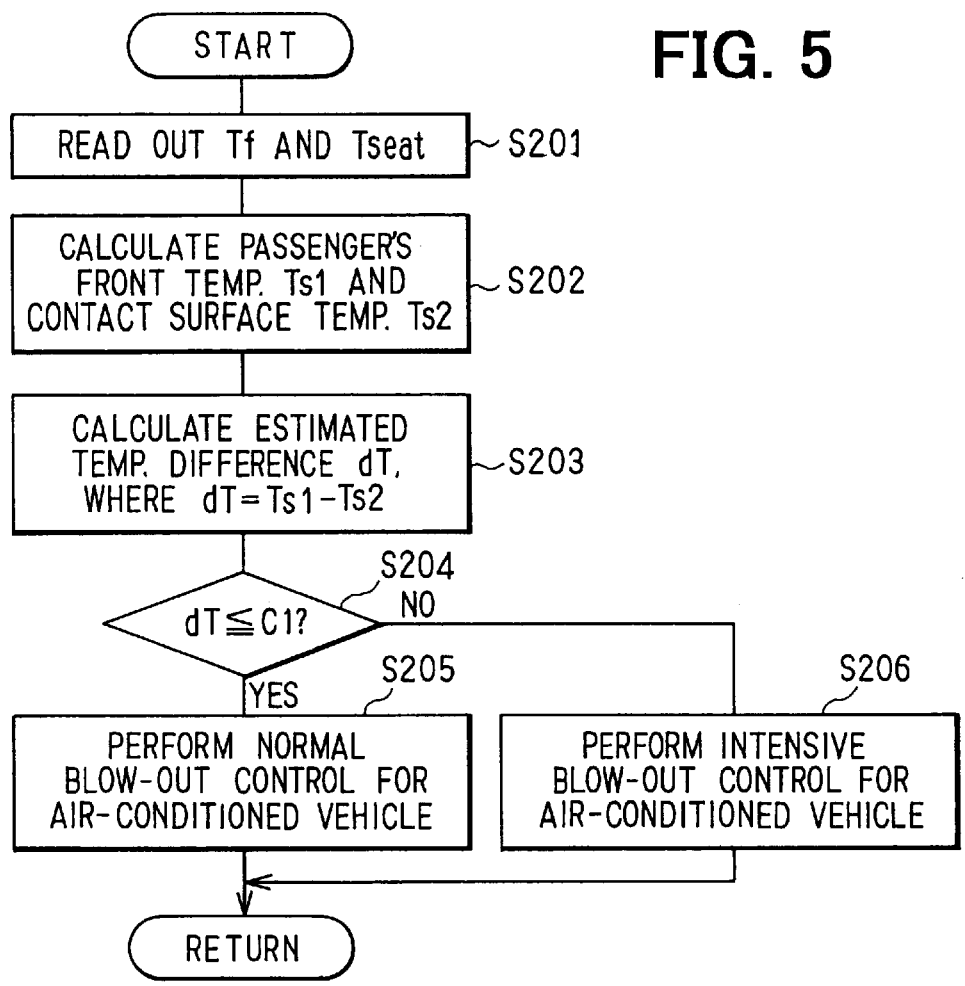
FIG. 5 is a flowchart showing part of a control program run by a control unit shown in FIG. 4.

Next, the following description will describe operation of the air conditioning system for a vehicle with reference to FIG. 5, which details the control program run by the control unit 4.

When the engine is started, the room air conditioner unit 1 and the seat air conditioner unit 2 begin to operate, and the control unit 4 controls the temperature and a quantity of air blown from the room air conditioner unit 1 in accordance with the control program detailed in FIG. 5 so as to reduce a difference in heat sensation between the front and the back of the passenger.

FIG. 5 shows the control program for the room air conditioner unit 1 run by the control unit 4 when the cold air is turned on. In Step S201, detection signals as to the passenger's front clothing temperature Tf and the seat surface temperature Tseat are read.

Then, in Step S202, a passenger's front temperature Ts1 is estimated from the passenger's front clothing temperature Tf, and the skin temperature (hereinafter, referred to as the contact surface temperature) Ts2 of the passenger at a portion of the passenger's skin in contact with the seat 3 is estimated from the seat surface temperature Tseat. Here, the passenger's front temperature Ts1 is the temperature of air surrounding the passenger excluding the portion in contact with the seat 3.

A heat balance expressed by Equation 1 below is established at the passenger's front side:

$$K1a(Tc-Ts1)=K1b(Ts1-Tf) \quad \text{(Equation 1)}$$

where Tc is the body temperature of the passenger, K1a is heat conductance from the body to the skin, and K1b is heat conductance from the skin to the clothes.

Here, a fixed value is given to the body temperature Tc, and the passenger's front temperature Ts1 is calculated by substituting the passenger's front clothing temperature Tf into Equation 1 above. Likewise, a heat balance expressed by Equation 2 below is established at the portion where the passenger is in contact with the seat 3:

$$K2a(Tc-Ts2)=K2b(Ts2-Tseat) \quad \text{(Equation 2)}$$

where K2a is heat conductance from the body to the skin and K2b is heat conductance from the skin to the seat 3 through the clothes.

Here, a fixed value is given to the body temperature Tc, and the contact surface temperature Ts2 is calculated by substituting the seat surface temperature Tseat into Equation 2 above. Then, in Step S203, an estimated temperature difference dT between the passenger's front temperature Ts1 and the contact surface temperature Ts2 is calculated. Here, the estimated temperature difference dT is defined as: dT=Ts1−Ts2.

Then, in Step S204, the estimated temperature difference dT is compared with a decision constant C1. The decision constant C1 corresponds to the certain value referred to in the above embodiments, and in the present embodiment, the decision constant C1 is a positive value, for example, 5° C.

It has been known that there is a correlation between the skin temperature and heat sensation. Hence, when the estimated temperature difference dT is equal to or less than the decision constant C1, a difference in heat sensation between the front and the back of the passenger is so small that the passenger may not have an uncomfortable feeling due to a difference in heat sensation.

Then, the flow proceeds to Step S205 when the estimated temperature difference dT is equal to or less than the decision constant C1. In Step S205, the room air conditioner unit 1 is placed under normal air-blow control because the difference in heat sensation between the front and the back of the passenger is so small that the passenger may not have an uncomfortable feeling. Alternatively, when the estimated temperature difference dT exceeds the decision constant C1, the flow proceeds to Step S206. In Step S206, the room air conditioner unit 1 is placed under intensive air-blow control so that the passenger's front temperature Ts1 is rapidly lowered.

During intensive air-blow control, operation of the swing louver 11 is controlled by narrowing the directional angles of the swing louver 11 and extending the time for blowing air conditioning air toward the passenger's seated position in comparison with the normal air-blow control. Hence, the actual temperature of air surrounding the passenger is lowered rapidly by performing the intensive air-blow control.

Figure 6:
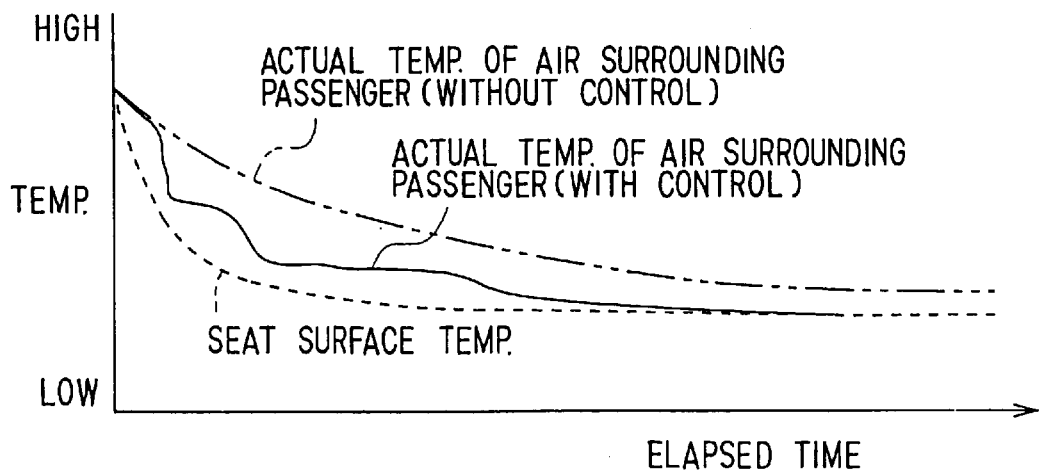
FIG. 6 is a graph showing changes in temperature at respective portions for use in explaining a function of the system according to the third embodiment.

As shown in FIG. 6, when the cold air is turned on, the actual temperature of air surrounding the passenger varies as indicated by a double-dashed chain line in the case where the above control is not performed. Additionally, the actual air temperature varies as indicated by a solid line in the case where the above control is performed. Therefore, it is understood that, by performing the above control, the estimated temperature difference dT is reduced and so is a difference in heat sensation between the front and the back of the passenger, and hence the comfortableness of the passenger compartment is improved.

(Fourth Embodiment)

Figure 7:
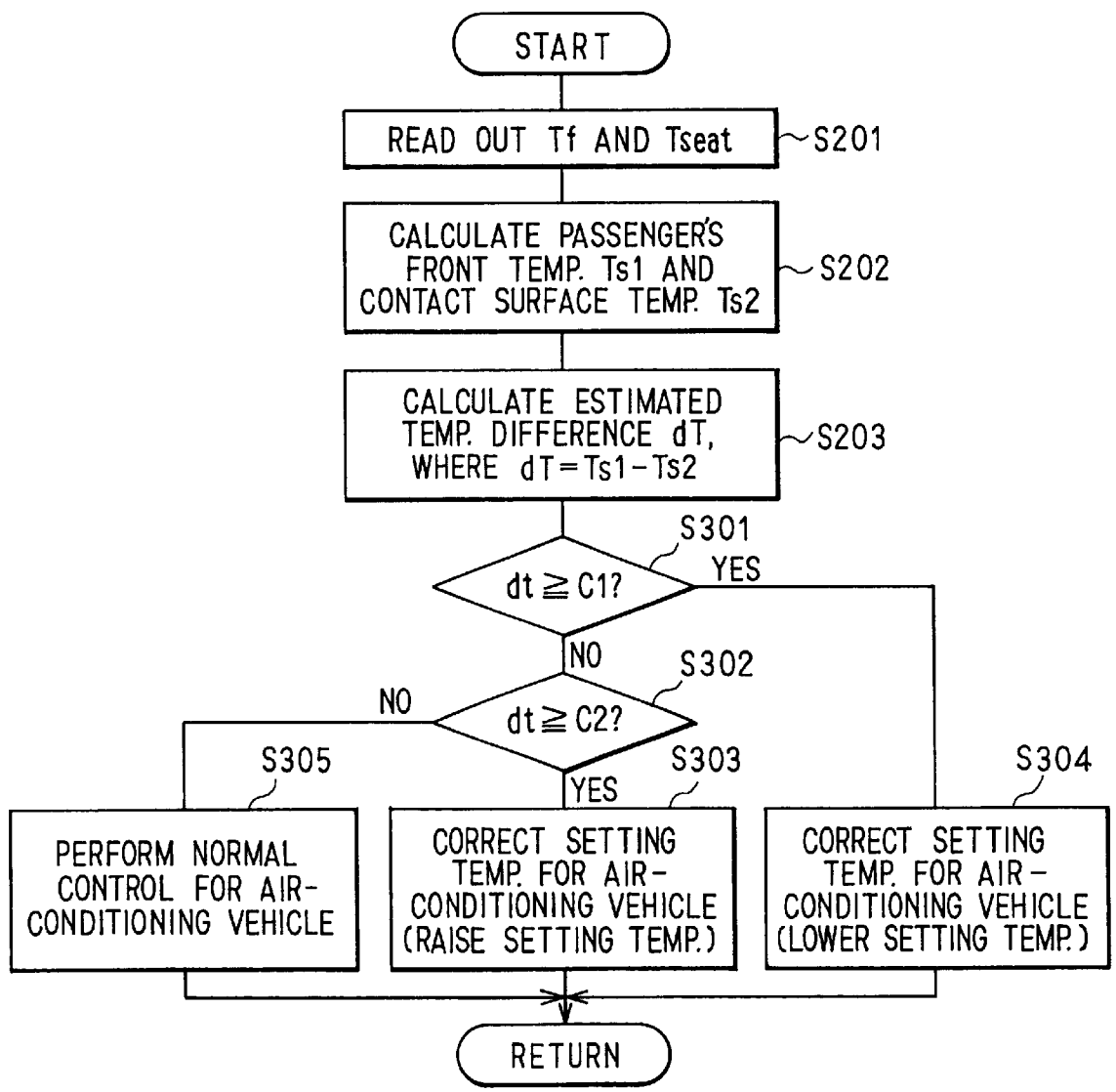
FIG. 7 is a graph showing part of a control program for an air conditioning system for a vehicle according to a fourth embodiment of the invention.

The third embodiment above described an example of the air conditioning system having the seat air conditioner unit 2. The present embodiment, however, is configured to reduce a difference in heat sensation between the front and the back of the passenger by controlling the operation of the room air conditioner unit 1 in an air conditioning system having no seat air conditioner unit 2. To this end, the control program (see FIG. 5) of the third embodiment above is changed as shown in FIG. 7. Steps of the fourth embodiment that are the same as steps of the third embodiment are labeled with the same step numbers so an explanation of those steps is omitted for ease of explanation.

Referring to FIG. 7, after the estimated temperature difference dT is calculated in Step S203, the estimated temperature difference dT is compared with a decision constant C1 in Step S301, and the estimated temperature difference dT is compared with a decision constant C2 in Step S302. The decision constant C1 is a positive value, for example, 5° C. whereas the decision constant C2 is a negative value, for example, −5° C. The two decision constants C1 and C2 correspond to the "certain value" referred to in other above embodiments.

Figure 8:
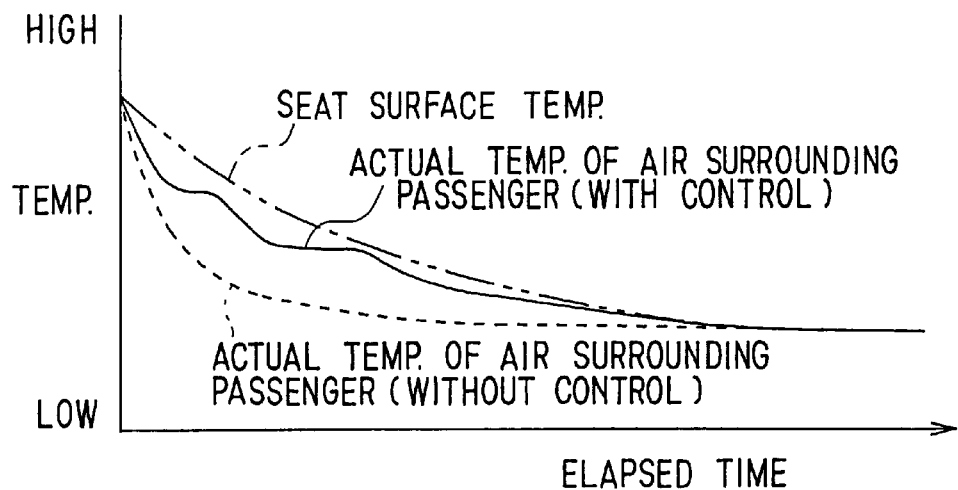
FIG. 8 is a graph showing changes in temperature at respective portions when the cooling is turned on for use in explaining a function of the system according to the fourth embodiment.

For example, in the case of a vehicle having no seat air conditioner unit 2, if the passenger compartment is cooled rapidly when the passenger initially enters the vehicle in the summertime, as shown in FIG. 8, the actual temperature of air surrounding the passenger is lowered far below the temperature of the seat surface, due to which the passenger may experience an uncomfortable feeling. In such a case of rapid cooling, when the estimated temperature difference dT between the passenger's front temperature Ts1 and the contact surface temperature Ts2 is equal to or less than the decision constant C2, in other words, when the passenger's front temperature Ts1 is far below the contact surface temperature Ts2, NO is judged in Step S301 and YES is judged in Step S302, and the flow thereby proceeds to Step S303.

In Step S303, a setting temperature set by the temperature setting switch is corrected. To be more specific, the setting temperature is corrected to a relatively high temperature for the time being to lessen the cooling performance. Accordingly, as shown in FIG. 8, the speed of decrease of the actual temperature of air surrounding the passenger is decreased. As a result, the passenger's front temperature Ts1 approaches the contact surface temperature Ts2, and the uncomfortable feeling the passenger may experience can be eliminated. In this instance, a correction of the setting temperature is set to the extent that the actual temperature of the air surrounding the passenger does not rise.

Figure 9:
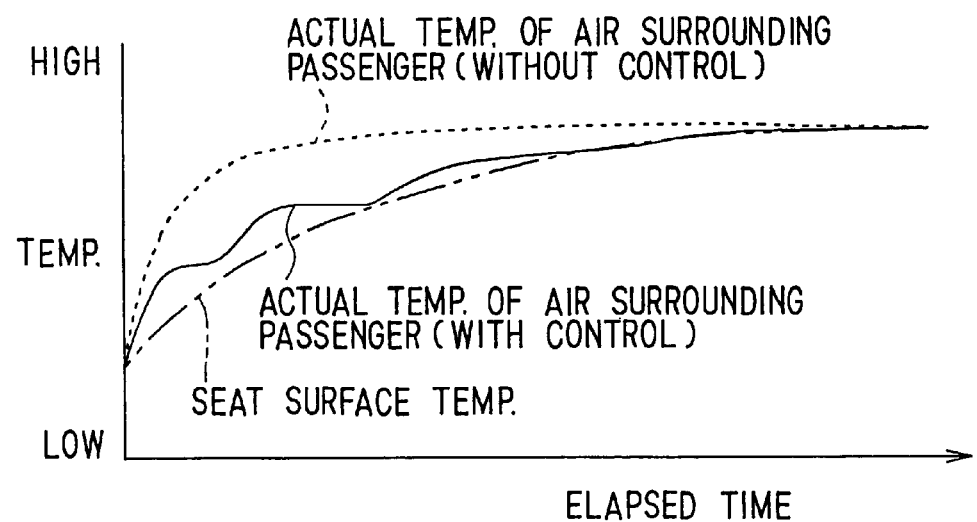
FIG. 9 is a graph showing changes in temperature at respective portions when the heater is turned on for use in explaining a function of the system according to the fourth embodiment.

Alternatively, in the case of a vehicle having no seat air conditioner unit 2, if the passenger compartment is heated rapidly when the passenger initially enters the vehicle in the wintertime, as shown in FIG. 9, the actual temperature of air surrounding the passenger rises far above the temperature of the seat surface, due to which the passenger may experience an uncomfortable feeling. In such a case of rapid heating, when the estimated temperature difference dT between the passenger's front temperature Ts1 and the contact surface temperature Ts2 is equal to or greater than the decision constant C1, in other words, when the passenger's front temperature Ts1 is far above the contact surface temperature Ts2, YES is judged in Step S301 and the flow thereby proceeds to Step S304.

In Step S304, a setting temperature set by the temperature setting switch is corrected. To be more specific, the setting temperature is corrected to a relatively low temperature for the time being to lessen the heating performance. Hence, as shown in FIG. 9, the rising speed of the actual temperature of air surrounding the passenger is decreased. As a result, the passenger's front temperature Ts1 approaches the contact surface temperature Ts2, and an uncomfortable feeling a passenger may have can be eliminated. In this instance, correction of the setting temperature is set to the extent that the actual temperature of air surrounding the passenger does not drop.

When the estimated temperature difference dT is below the decision constant C1 (NO in Step S301) and exceeds the decision constant C2 (NO in Step S302), the flow proceeds to Step S305. In Step S305, since a difference in heat sensation between the front and the back of the passenger is so small that the passenger may not experience an uncomfortable feeling, the room air conditioner unit 1 is placed under normal control. Incidentally, the normal control referred to herein means the control under which no correction is made to the setting temperature.

According to the present embodiment, even in the air conditioning system having no seat air conditioner unit 2, a difference in heat sensation between the front and the back of the passenger is reduced by controlling an operation of the room air conditioner unit 1. Hence, the comfortableness of the passenger compartment can be improved.

(Other Embodiments)

(1) In the first and second embodiments above, the temperature difference Td between the seat surface temperature Tseat and the passenger's front clothing temperature Tf is adjusted to fall within the "certain value" by controlling the operation of the seat air conditioner unit 2. However, the temperature difference Td may be adjusted to fall within the certain value by controlling the temperature and a quantity of air blown from the room air conditioner unit 1.

(2) Also, in the first and second embodiments above, the seat surface temperature Tseat is defined as the temperature at a portion where the back of the passenger is not in contact with the surface of the seat 3. However, it is obvious from experience that the temperature of the surface of the seat 3 is higher at a portion in contact with the back of the passenger than at a portion not in contact with the back of the passenger. Hence, control may be performed by estimating the temperature on the surface of the seat 3 at a portion in contact with the back of the passenger.

To be more specific, when an infrared sensor is employed as the temperature sensor 5 to detect the temperature on the surface of the seat 3 at a portion not in contact with the back of the passenger, a temperature on the surface of the seat 3 at a portion in contact with the back of the passenger is estimated with consideration given to the body temperature of the passenger, the temperature of air blown from the seat 3, a material of the surface portion of the seat 3, etc. The temperature thus estimated is defined as the seat surface temperature Tseat. Then, operation of the seat air conditioner unit 2 may be controlled so that the temperature difference Td between the seat surface temperature Tseat and the passenger's front clothing temperature Tf falls within the certain value. When the air conditioning system is configured in this manner, heat sensation at the back of the passenger can be estimated more accurately, which allows more appropriate control to be performed. Hence, the comfortableness of the passenger compartment can be further improved.

It should be noted, however, that the seat surface temperature Tseat referred to in the first and second embodiments above is not identical to the seat surface temperature Tseat referred to in this embodiment. Therefore, it is preferable to change the summertime allowable upper limit Td1, the summertime allowable lower limit Td2, the wintertime allowable upper limit Td3, and the wintertime allowable lower limit Td4 to values suitable to this embodiment.

(3) Also, in the first and second embodiments above, the seat surface temperature Tseat and the passenger's front clothing temperature Tf are detected by a single temperature sensor 5. However, a sensor for detecting the seat surface temperature Tseat and a sensor for detecting the passenger's front clothing temperature Tf may be provided separately. In this case, it is preferable to provide the temperature sensor composed of a thermocouple, a resistance temperature sensor, etc., in the interior of the seat 3 at a portion closer to the surface of the seat 3 that is in contact with the back of the passenger, so that the temperature on the surface of the seat 3 at a portion in contact with the back of the passenger is detected directly. When the air conditioning system is configured in this manner, heat sensation at the back of the passenger can be estimated more accurately, which allows more appropriate control to be performed. Hence, the comfortableness of the passenger compartment can be further improved.

It should noted, however, that the seat surface temperature Tseat referred to in the first and second embodiments above is not identical with the seat surface temperature Tseat referred to in this embodiment, and therefore, it is preferable to change the summertime allowable upper limit Td1, the summertime allowable lower limit Td2, the wintertime allowable upper limit Td3, and the wintertime allowable lower limit Td4 to values suitable to this embodiment.

(4) Also, control as follows may be performed when the cold air is turned on for a passenger who feels cold. That is, a quantity and the temperature of air blown from the seat cushion 31 and a quantity and the temperature of air blown from the seat back 32 are made to be independently adjustable. Also, an infrared sensor having many thermal sensing elements is employed as the temperature sensor 5.

When the passenger is assumed to be cold from a temperature distribution of the passenger detected by the temperature sensor 5, in particular, from the temperature distribution at the person's extremities, such as the hands and feet, not only the cooling performance of the room air conditioner unit 1 is lessened, but also a quantity of air blown from the seat cushion 31 is regulated, so that the feet of the passenger assumed to feel cold will not be cooled more than necessary. Consequently, the passenger assumed to feel cold will not have any uncomfortable feelings or feel coldness, and a comfortable condition can be created without considering the heat sensations of the other passengers.

(5) Also, in the third and fourth embodiments above, fixed values are given to the decision constants C1 and C2. However, the values may vary in response to the air-conditioned condition in the passenger compartment.

When the air-conditioned condition in the passenger compartment is in transition, in other words, when there is a considerable difference between the room temperature and the setting temperature, the decision constants C1 and C2 may be increased, so that an uncomfortable feeling the passenger may experience due to a difference in heat sensation between the front and the back of the passenger can be reduced while the time necessary to achieve the target room temperature is maintained. Also, when the air-conditioned condition in the passenger compartment is stable, in other words, when there is a small difference between the room temperature and the setting temperature, the decision constants C1 and C2 may be decreased, so that infants or elderly people with suppressed temperature-controlling functions feel comfortable because the stress they may feel is lessened.

(6) Alternatively, the values of the decision constants C1 and C2 in the third and fourth embodiments above may be changed from seat to seat. When the air conditioning system is configured in this manner, in the event that air conditioning heat load varies from seat to seat due to the influence of sunlight, for example, the control that best suits each seat can be performed by setting the values of the decision constants C1 and C2 for each seat.

(7) Further, each passenger may be allowed to set the values of the decision constants C1 and C2 in the third and fourth embodiments above, so that the control will be performed as each passenger desires.

(8) Furthermore, in the third and fourth embodiments above, the estimated temperature difference dT is calculated using the passenger's front temperature Ts1 and the contact surface temperature Ts2, and the succeeding control is determined by comparing the estimated temperature difference dT thus calculated with the decision constant C1. However, the succeeding control may be determined on the basis of heat sensation of the passenger.

To be more specific, the skin temperature at the front of the passenger is found from the passenger's front clothing temperature Tf, and heat sensation at the front of the passenger estimated from the skin temperature (equivalent to the passenger's front temperature Ts1) is converted into numbers. Meanwhile, the skin temperature at the back of the passenger is found from the seat surface temperature Tseat, and heat sensation at the back of the passenger estimated from the skin temperature (equivalent to the contact surface temperature Ts2) is also converted into numbers. Then, an estimated difference in heat sensation is calculated using these two numerical forms of heat sensation, and the succeeding control is determined by comparing the estimated difference in heat sensation with a decision constant.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air conditioning system for a vehicle, comprising:
    a room air conditioner unit for air conditioning a passenger compartment;
    a seat air conditioner unit for adjusting a surface temperature of a seat within said passenger compartment;
    a temperature sensor for detecting a surface temperature of a front of a passenger seated on said seat and the surface temperature of said seat; and
    a control unit for controlling operation of at least one of said room air conditioner unit and said seat air conditioner unit so that a difference between the temperature at the front of said passenger and the temperature of said seat falls within a certain value range related to a certain value.

2. The air conditioning system for a vehicle according to claim 1, wherein:
    said temperature sensor is an infrared sensor that includes an element for detecting the surface temperature at the front of said passenger and an element for detecting the surface temperature of said seat.

3. The air conditioning system for a vehicle according to claim 1, wherein:
    said temperature sensor is composed of a sensor for detecting the surface temperature at the front of said passenger and a sensor for detecting the surface temperature of said seat at a portion in contact with a back of said passenger.

4. The air conditioning system for a vehicle according to claim 1, wherein:

said seat air conditioner unit includes a blower for blowing air to be blown from said seat, and an air-quantity regulating means for regulating a quantity of air blown from a right side of said seat and a quantity of air blown from a left side of said seat;

said temperature sensor is a sensor capable of detecting a surface temperature at a right front of said passenger and a surface temperature at a left front of said passenger; and said control unit controls operation of said air-quantity regulating means based on the surface temperature at the right front of said passenger and the surface temperature at the left front of said passenger.

5. An air conditioning system for a vehicle, comprising:

a room air conditioner unit for air conditioning a passenger compartment; and air-conditioned condition detecting means for detecting a value indicating an air-conditioned condition of a front of a passenger seated on a seat and a value indicating an air-conditioned condition at a contact surface of said passenger with said seat, wherein operation of said room air conditioner unit is controlled so that a difference between two detected values respectively indicating said air-conditioned conditions falls within a certain value range related to a certain value.

6. The air conditioning system for a vehicle according to claim 5, wherein:

the two detected values respectively indicating said air-conditioned conditions are one of a skin temperature of said passenger and a heat sensation of said passenger estimated from the skin temperature of said passenger.

7. An air conditioning system for a vehicle, comprising:

a room air conditioner unit for air conditioning a passenger compartment;

a seat air conditioner unit for adjusting a temperature of a seat; and air-conditioned condition detecting means for detecting a value indicating an air-conditioned condition at a front of a passenger seated on said seat and a value indicating an air-conditioned condition at a contact surface of said passenger with said seat, wherein a direction of air blown from said room air conditioner unit is controlled so that a difference between two detected values respectively indicating said air-conditioned conditions falls within a certain value range related to a certain value.

8. The air conditioning system for a vehicle according to claim 7, wherein:

the two detected values respectively indicating said air-conditioned conditions are one of a skin temperature of said passenger and a heat sensation of said passenger estimated from the skin temperature of said passenger.

9. The air conditioning system for a vehicle according to claim 8, wherein:

the skin temperature of said passenger is determined based on a temperature of clothing said passenger is wearing and the temperature of said seat.

10. The air conditioning system for a vehicle according to claim 9, wherein:

said air-conditioned condition detecting means is an infrared sensor for detecting the temperature of the clothing said passenger is wearing and the temperature of said seat.

11. The air conditioning system for a vehicle according to claim 10, wherein:

said infrared sensor includes an element for detecting the temperature of the clothing said passenger is wearing and an element for detecting the temperature of said seat.

12. The air conditioning system for a vehicle according to claim 11, wherein:

said certain value is changed in response to an air-conditioned condition in said passenger compartment.

13. The air conditioning system for a vehicle according to claim 12, wherein:

said certain value is set for each seat.

14. The air conditioning system for a vehicle according to claim 13, wherein:

said certain value is set by each passenger.

15. An air conditioning system for a vehicle, comprising:

a room air conditioner unit for air conditioning a passenger compartment;

a seat air conditioner unit for adjusting a temperature of a seat within said passenger compartment;

a temperature sensor for detecting a temperature of a surface associated with a passenger seated on said seat and the temperature of said seat; and a control unit for controlling operation of at least one of said room air conditioner unit and said seat air conditioner unit so that a difference between the temperature of a surface associated with said passenger and the temperature of said seat falls within a certain value range related to a certain value.

* * * * *